United States Patent Office 3,227,107
Patented Jan. 4, 1966

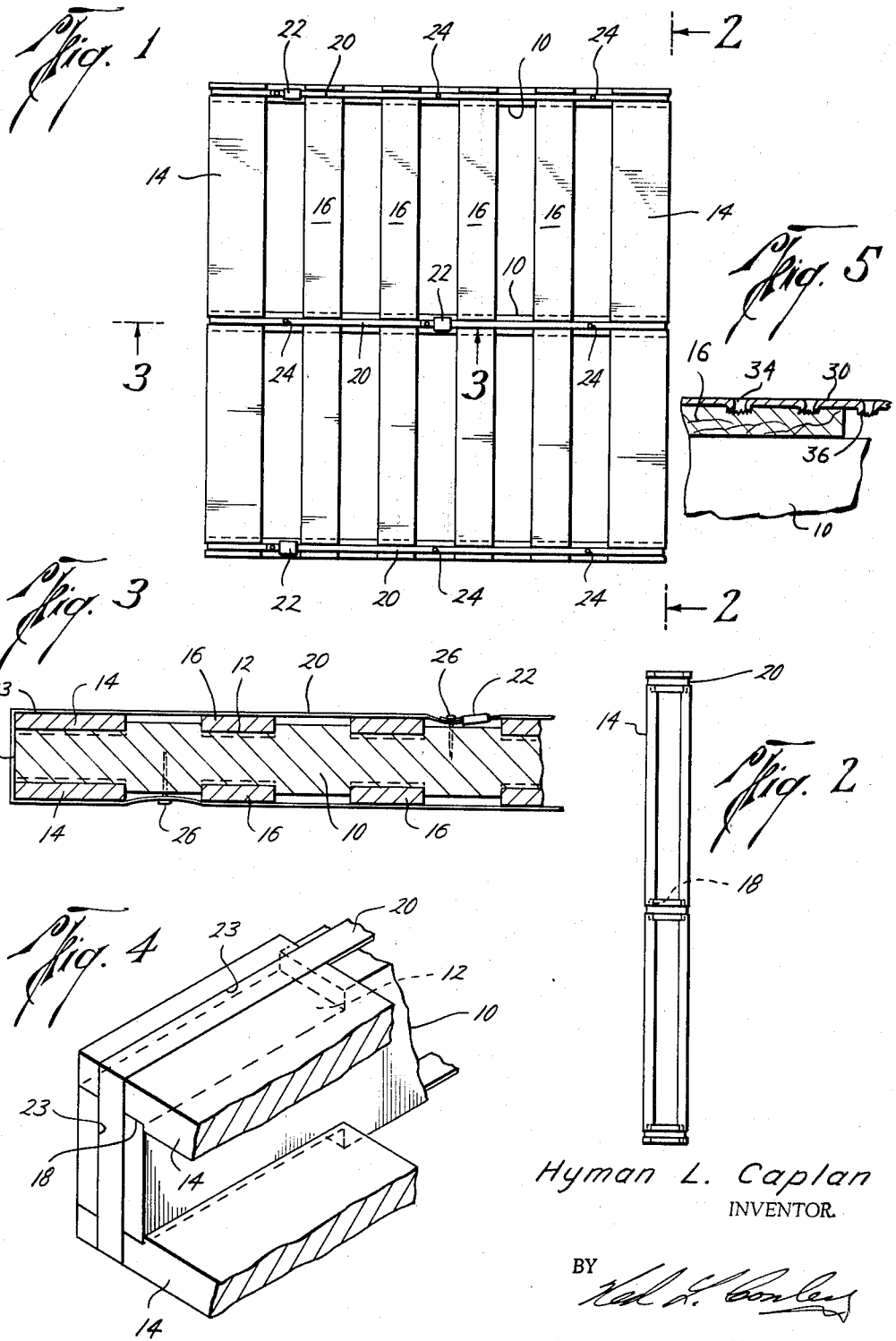

3,227,107
PALLET
Hyman L. Caplan, 2201 S. Wayside Drive, Houston, Tex.
Filed Sept. 28, 1964, Ser. No. 399,541
13 Claims. (Cl. 108—51)

This invention relates to an improved pallet for loading, shipping, transporting and storing goods.

The invention particularly relates to pallets of the type that are commonly lifted, transferred and deposited by a fork-lift truck. Such pallets are commonly used in factories, warehouses, freight terminals and elsewhere for facilitating transfer of various types and kinds of goods. In the normal situation the pallets are subjected to rigorous use, often being damaged by inaccurate operation of the lift truck, by dropping of the pallets, and by overloading. Being customarily manufactured of wood, the pallets also become worn and eventually broken under normal use, necessitating frequent repair and purchases of new pallets. There has been a continuous compromise between cost and quality of pallets due to the fact that the number of pallets that may be in use in a given installation may be so large that the total cost becomes a material factor in determining the economic practicability of a fork-lift truck transfer system.

For this reason the usual pallet is of simple construction, usually involving two or three parallel stringers such as 2 x 4's across which are nailed a series of one-inch boards in either edge to edge or spaced relation. Obviously the warping and twisting of the pallet as it is raised and lowered by the lift-truck causes the nails to give slightly, weakening the pallet and making possible damage to the goods carried on the pallet. Continued use thereafter under similar rigorous conditions causes even greater deterioration, eventually resulting in splitting of the boards and ultimate scrapping of the pallet.

While various improvements in pallet construction have heretofore been constructed, such improvements have failed to result in an inexpensive, readily repaired pallet which can give much longer life than the ordinary nailed-together pallet. Nailed pallets are objectionable also because the nails gradually work out and cause damage to goods carried thereon. Of course once a nail has worked loose it is impossible to re-tighten it so that the pallet is in original condition.

I have therefore devised an improved pallet construction which not only gives greater original strength to the pallet but also results in a pallet construction of longer life and one that can be readily repaired and returned to original utility. In addition the pallet is designed so that it can be constructed without any nails to fasten the wooden members together so that loosening nails cannot damage goods carried on the pallet.

According to a preferred embodiment of my invention such improved pallet construction is obtained by interlocking the crossed members of the pallet and binding them together with flexible steel bands or strapping which extends longitudinally around the stringers. The strapping is recessed below the surface of the wooden elements and no nails are used to hold the wooden elements together. Thus no metal elements of the pallet may engage and damage goods carried on the pallet. Preferably the pallet construction utilizes spaced apart cross-boards and a headed fastener driven through the strap between the cross-boards is used to tighten the strap in the event that it should become loosened due to shrinkage of the wood or other causes during the use of the pallet.

In another embodiment of the invention, a strapping is used which has a roughened surface engaging the wooden members to prevent slippage therebetween.

For a better understanding of the invention reference is now made to the following description and to the accompanying drawings, wherein:

FIGURE 1 is a plan view of a preferred embodiment of the invention;

FIGURE 2 is an elevational view of the embodiment of FIGURE 1 taken at line 2—2 of FIGURE 1;

FIGURE 3 is an enlarged partial vertical sectional view of the embodiment of FIGURE 1 taken at line 3—3 of FIGURE 1;

FIGURE 4 is an enlarged fragmentary view of a portion of the embodiment shown in FIGURE 1; and FIGURE 5 is an enlarged fragmentary cross-sectional view depicting another embodiment of the invention.

In the embodiment shown in the drawings, the pallet is constructed of a plurality of stringers 10, three being shown. Two of these form edge stringers and one a center stringer. The stringers are provided with a plurality of spaced apart recesses 12 in their upper and lower surfaces and the recesses in each of the stringers are aligned with the recesses in the other stringers so as to provide means for engagement by end cross-boards 14 and intermediate cross-boards 16. The cross-boards are provided with complementary recesses 18 proportioned and positioned to engage the recesses 12 in the stringers so as to interlock the cross-boards with the stringers. A thin flexible steel strap or band 20 of a type well known in the art extends longitudinally around each of the stringers 10 and encloses the cross-boards and tightly binds the cross-boards and the stringers in interlocked relationship. A strapping clamp 22 secures the ends of each strap together. Shallow recesses 23 are provided in the outer surfaces of the cross-boards and in the ends of the stringers to receive the straps 20 so that no portion of the straps protrude above the outer surface of the wooden members.

In a preferred embodiment of the invention each of the straps 20 is provided with a plurality of small holes 24 therethrough, through which a headed fastener such as a screw-shanked nail 26 may be driven. Instead of a screw-shanked nail a wood screw or any other threaded shank headed fastener may be used. The term "threaded" as here used includes elements having circular threads on the shank as well as those having helical threads. The preferred structure to be utilized is a member which has some means to resist pulling of the member from the wood.

In another embodiment of the invention a strapping material is used which has a roughened surface for gripping the wooden members encompassed by the strap so as to reduce the chance of slippage between the strap and the wooden members. In the form shown in FIGURE 5, a strap 30 is provided with a substantial number of punched holes 34 which may be distributed uniformly or randomly along the length of the strap. These holes may, for example, be punched just before the strapping is applied to the pallet, and the punching is such as to cause a ragged edge 36 on the face of the strap which engages the stringers 10 and crossboards 16. The spacing of the punched holes is preferably such that at least one ragged edge engages each cross-board so as to bite into the board and prevent slippage.

It will be seen that the pallet of this invention is readily assembled by merely laying the cross-boards on the stringers with the recesses 12 and 18 interlocked and then applying the straps longitudinally around the stringers by means of the usual strapping machines. As thus initially assembled the pallets will have above average strength due to the interlocking of the wooden members and to the steel strapping which holds the wooden members in the interlocked relationship. However, even if the pallet is made of dried lumber the lumber will still shrink at least a small amount over a period of time and such shrinkage will cause some loosening of the strapping. In addition repeated loading of the pallet will cause flexing which will deform the interlocking joints so as to result in some loosening of the strapping. According to a preferred embodiment of this invention such loosening of the strapping is readily compensated for by mere adjustment of the threaded fasteners. When initially assembled each strap may be provided with a plurality of perforations 24 therein through which the threaded fasteners may be inserted to engage the stringers. It may be most desirable to initially use only one such fastener per strap and this fastener may not be tightened down all the way but may be left with a portion of its shank exposed so that when some loosening of the interlocking wooden members occurs this fastener may be tightened to draw the strap tighter around them and thereby regain the strength and rigidity of the original assembly. As the pallet is used more extensively so that more loosening occurs, additional fasteners are inserted through the various perforations 24 to regain the original tightness, rigidity and strength of the pallet.

In the construction of a preferred embodiment of this invention no metal elements are exposed above the surface of the wooden cross members so that they can cause damage to goods carried on the pallets. The straps are recessed in the surface of the cross members and the ends of the stringers to prevent their being caught on any goods carried on the pallets.

It will be apparent that repairs are readily accomplished on the pallet of the present design. It is only necessary to cut the steel straps and lift out any broken or damaged boards and replace them with new boards and then rebind the pallet with a new strap. It will be appreciated that such repairs can be accomplished in a minimum of time at little cost as compared to the difficulty of repairing pallets in the past wherein the crossboards are secured by nails. Thus the pallets of this design may be readily repaired when damaged to an extent that with previous designs would have required replacement of the pallets. By virtue of this saving and the advantages referred to hereinbefore the total cost of pallets for fork-lift handling is greatly reduced.

Although a preferred embodiment of the invention has been shown and described herein the invention is not limited to such embodiment but only as set forth by the following claims:

1. A pallet comprising
   at least two parallel wooden stringers,
   a plurality of spaced-apart cross-boards extending across and interlocked with said stringers,
   a flexible metal strap wrapped longitudinally around each stringer and tightly engaging said cross-boards to hold them securely interlocked with said stringers and prevent relative movement therebetween, and
   at least one headed fastener extending through each strap between the cross-boards with its head engaging the band, a portion of its shank secured in the stringer under the band, and a portion of its shank left free between the strap and the stringer.

2. A pallet comprising
   at least two parallel wooden stringers having oppositely positioned recesses formed in their upper and lower surfaces,
   a plurality of spaced-apart wooden cross-boards extending across said stringers and having cooperating recesses interlocked with the recesses in the stringers,
   a flexible metal strap wrapped longitudinally around each stringer and tightly engaging said cross-boards to hold them in interlocking relationship with the stringers, said straps being recessed below the outer surfaces of the cross-boards and the ends of the stringers.

3. A pallet as defined by claim 2 and including means for periodically tightening said straps.

4. A pallet as defined by claim 3 wherein said means comprises at least one headed fastener extending through each strap between a pair of cross-boards with its head engaging the strap and at least a portion of its shank secured to the stringer encompassed by the strap.

5. A pallet as defined by claim 4 wherein said fastener has a threaded shank.

6. A pallet comprising
   at least two parallel wooden stringers having oppositely positioned recesses formed in their upper and lower surfaces,
   a plurality of spaced-apart wooden cross-boards extending across said stringers and having cooperating recesses interlocked with the recesses in the stringers, said cooperating recesses having a depth such that the surfaces of the boards protrude above the surfaces of the stringers,
   a flexible metal strap wrapped longitudinally around each stringer and tightly engaging said cross-boards to hold them in interlocking relationship with the stringers, said straps being recessed below the outer surfaces of the cross-boards and the ends of the stringers.

7. A pallet as defined by claim 6, and including at least one headed fastener extending through each strap between a pair of cross-boards with its head engaging the strap and at least a portion of its shank secured to the stringer encompassed by the strap.

8. A pallet including:
   two parallel stringers, said stringers having recessed portions for receiving crosspieces whereby motion of said crosspieces is restricted in a direction along said stringers;
   a plurality of crosspieces positioned by said stringer recesses, said crosspieces having cutout portions limiting motion of said crosspieces in a direction substantially perpendicular to said stringers.

9. The device of claim 8 and further including binding means wrapped around said stringers and the ends of said crosspieces in such a manner as to unify said stringers and crosspieces and to permit the device to present an upper surface having no projections upwardly of the upper surface of said crosspieces.

10. A pallet including the following:
    a plurality of parallel aligned stringers;
    a plurality of aligned crosspieces with opposite ends spacedly positioned atop said stringers in a direction substantially perpendicular thereto;
    binding means encompassing said stringers and said opposite ends of said crosspieces; and
    threadedly adjustable tightening means positioned intermediate at least some of said opposite ends of said crosspieces and passing through said binding means and into the body of said stringers, thereby permitting a number of points of independent adjustment of the tightness of said binding means.

11. The device of claim 10 wherein at least one of said tightening means is positioned intermediate adjacent of said opposite ends and said binding means are recessed in the upper surfaces of said opposite ends so as to provide a pallet having no projection above the upper surface of said crosspieces.

12. A pallet including the following:
    a pair of parallel stringers each of said stringers having a plurality of recessed portions for receiving crosspieces, said recessed portions limiting motion of said crosspieces in a first direction along the length of said stringers;
    a plurality of crosspieces positioned by said stringer recesses, said crosspieces each also having first recessed portions at each end thereof limiting motion, when positioned astride said stringers in a second direction angularly related to said first direction;

binding means encompassing said stringers and said crosspiece ends; and threadedly adjustable tightening means positioned intermediate at least some of said crosspiece ends and passing through said binding means and into the body of said stringers, providing a plurality of points of independent adjustment of the tightness of said binding means.

13. The device of claim 12 and including second recessed portions in said crosspiece ends for the positioning of said binding means in such a manner that no projection extends upwardly of the upper surface of said crosspieces.

References Cited by the Examiner

UNITED STATES PATENTS

| | | | |
|---|---|---|---|
| 1,605,901 | 11/1926 | O'Neil | 108—55 X |
| 2,783,960 | 3/1957 | Herz et al. | 108—56 |
| 2,982,507 | 5/1961 | Woodward | 108—57 |
| 3,005,610 | 10/1961 | Arthur | 108—58 |
| 3,039,726 | 6/1962 | Woodward | 108—57 |
| 3,122,108 | 2/1964 | Arthur | 108—51 |
| 3,131,655 | 5/1964 | Sellers et al. | 108—51 |

FOREIGN PATENTS

| | | |
|---|---|---|
| 699,130 | 10/1953 | Great Britain. |
| 907,946 | 10/1962 | Great Britain. |

FRANK B. SHERRY, *Primary Examiner.*

G. O. FINCH, *Assistant Examiner.*